(12) United States Patent
Richardson et al.

(10) Patent No.: US 8,999,034 B2
(45) Date of Patent: Apr. 7, 2015

(54) METHOD FOR IMPROVING GOLD RECOVERY

(71) Applicant: Chemtreat, Inc., Glen Allen, VA (US)

(72) Inventors: John Richardson, Hanover, VA (US); Robert Bedinger, Richmond, VA (US); Kevin Gottschalk, Maidens, VA (US)

(73) Assignee: Chemtreat, Inc., Glen Allen, VA (US)

( * ) Notice: Subject to any disclaimer, the term of this patent is extended or adjusted under 35 U.S.C. 154(b) by 0 days.

(21) Appl. No.: 13/865,979

(22) Filed: Apr. 18, 2013

(65) Prior Publication Data

US 2014/0348728 A1 Nov. 27, 2014

Related U.S. Application Data

(60) Provisional application No. 61/635,290, filed on Apr. 18, 2012.

(51) Int. Cl.
*C22B 59/00* (2006.01)
*C22B 3/00* (2006.01)

(52) U.S. Cl.
CPC ...................................... *C22B 11/04* (2013.01)

(58) Field of Classification Search
None
See application file for complete search history.

(56) References Cited

U.S. PATENT DOCUMENTS

| | | | | |
|---|---|---|---|---|
| 4,929,274 A | * | 5/1990 | Luttinger | 423/25 |
| 5,827,348 A | * | 10/1998 | Waddell et al. | 75/733 |
| 8,287,616 B2 | * | 10/2012 | Seelmann-Eggebert et al. | 75/300 |
| 2003/0192403 A1 | * | 10/2003 | Burgmayer | 75/743 |

* cited by examiner

*Primary Examiner* — Steven Bos
(74) *Attorney, Agent, or Firm* — Oliff PLC

(57) ABSTRACT

Disclosed are methods and compositions for improving metal extraction processes by introducing at least one cationically charged compound selected from a group consisting of amines, particularly quaternary amines such as alkyldimethylbenzylammonium chlorides (ADBAC compounds), polyamines and other suitable cationic organic materials, and mixtures thereof, for neutralizing and/or coagulating excess anionic organic compounds including, for example, flotation reagents, surfactants, polymers, flotation reagent by-products and/or anti-scalant additives found in metal concentrate streams, and thereby reduce the downstream fouling of the activated carbon by these compounds.

18 Claims, 9 Drawing Sheets

METHOD FOR IMPROVING GOLD RECOVERY

PRIORITY STATEMENT

This application claims priority under 35 U.S.C. §119(e) from U.S. Provisional Application No. 61/635,290, filed Apr. 18, 2012, the contents of which are incorporated, by reference, in their entirety.

FIELD OF THE INVENTION

The disclosed methods are useful in leach processes, particularly those that use activated carbon for extracting precious metals e.g., gold, from leachate using carbon-in-leach (CIL), carbon-in-pulp (CIP) and/or carbon-in-column (CIC) configurations.

The present invention relates to the treatment of aqueous cyanide-containing compositions that comprise at least one anionic surfactant and/or an anionic polymer, and to a process for extracting metals, in particular gold and/or silver, from materials or minerals which comprise the corresponding metal with the aid of this aqueous cyanide-containing composition. In particular, the present invention can be used to reduce the impact of additives utilized in producing a concentrated metal solution including, for example, surfactants, anti-scalants and other additives that are used to improve upstream processes such as leach extraction and flotation. Certain of these additives, while useful in the upstream process, tend to reduce the effectiveness of the activated carbon downstream, thereby suppressing the overall process yield. The disclosed methods involve treating these concentrated metal solutions using one or more cationic compounds to improve the performance of the activated carbon processes.

Embodiments of this invention are useful in combination with various gold extraction processes. Gold is among the rarest elements in our world comprising perhaps only about 4 mg/t (4 ppb) of the Earth's crust. Gold is not uniformly distributed, however, and is typically found in higher concentration as lodes, veins or other deposits in quartz rock, often in combination with pyrites, arsenopyrite, copper ores and silver ores. Most gold occurs in elemental form, although most gold particles are relatively small. Gold is commonly alloyed with silver but may also include copper, platinum and other metals as impurities. Some gold minerals are also found in naturally occurring tellurides including, for example, calayerite ($AuTe_2$), sylvanite ($AgAuTe_4$) and nagyagite ($Pb_5Au(Te,Sb)_4S_{5-8}$).

Most modern gold extraction processes treat the gold ore using amalgamation or cyanide leaching. Amalgamation, in which the gold-containing ore is crushed and mixed with water and mercury to form an alloy (amalgam) from which the mercury can be subsequently removed by distilling at elevated temperatures, e.g., 600° C. or above.

In cyanide leaching a sodium or potassium cyanide solution is added to a heap of gold containing ore, or to a vessel containing finely milled rock while supplying atmospheric oxygen and, if appropriate, in the presence of lime to form a complex gold cyanide compound according to the following reaction:

$$Au+8NaCN+O_2+2H_2O \rightarrow 4Na[Au(CN)_2]+4NaOH \quad [1].$$

The gold can be recovered from the cyanide compound using a number of techniques including, for example, by reduction (for example using zinc turnings), selective adsorption onto active carbon (e.g., CIP, CIL and CIC processes) or ion exchangers (e.g., resin-in-pulp process (RIP)) with subsequent desorption using concentrated cyanide solution or zinc cyanate in the case of ion exchangers. The gold ions can then be reduced from the cyanide complexes electrolytically (electrowinning) or by adding zinc powder.

In the heap leaching process ore is mined, crushed and formed into large heaps and then sprayed from above with the cyanide liquor so that the cyanide liquor can percolate or trickle through the rock. The mother liquor enriched with gold, i.e., the pregnant solution, collects at the bottom of the heap.

As noted above, other metals are frequently found with the gold including, in particular, silver and copper. As with the gold, silver may extracted by cyanide leaching in which ore material comminuted to a fine sludge is leached with 0.1 to 0.2% strength sodium cyanide solution with thorough ventilation, both metallic silver and silver sulfide and silver chloride going into solution as dicyanoargentate (I):

$$2Ag+H_2O+1/2O_2+4NaCN \rightarrow 2Na[Ag(CN)_2]+2NaOH \quad [2]$$

$$Ag_2S+4NaCN_2 \leftrightarrow Na[Ag(CN)_2]+Na_2S \quad [3]$$

$$2AgCl+4NaCN \rightarrow 2Na[Ag(CN)_2]+2NaCl \quad [4]$$

Because reaction [3] leads to an equilibrium, the sodium sulfide $Na_2S$ formed during the leaching of sulfidic silver ores must be oxidized by blowing in air:

$$2S^{2-}+2O_2+H_2O \rightarrow S_2O_3^{2-}+2OH^- \quad [5]$$

or precipitated by adding lead salt:

$$Pb^{2+}+S^{2-} \rightarrow PbS \quad [6]$$

to shift the equilibrium in favor of the forward reaction. The silver can then be precipitated from the resulting clear liquors by introducing zinc or aluminum dust $$2Na[Ag(CN)_2]+Zn \rightarrow Na_2[Zn(CN)_4]+2Ag \quad [7]$$

after which the slurry is subjected to further processing to recover the silver.

Although the cyanide processes avoid the problems associated with mercury, it does require large quantities of cyanide salts for separating the metal from the metal-containing ore and other materials. Thus, when extracting gold or silver, up to 300 g of cyanide per metric ton of material can be required, depending on the characteristics of the gold- and/or silver-containing material. Even with large quantities of cyanide salts, it can still be difficult to achieve a high recovery percentage of the desired metals from the starting material(s).

A number of prior art references have addressed the addition of a variety of surfactants to the cyanide liquor for improving the effectiveness of the cyanide leaching by which the amount of cyanide required can be decreased and/or the duration of the extraction process can be reduced while maintaining or increasing the process yield.

For example, U.S. Pat. No. 5,827,348 describes the use of fluoroaliphatic surfactants for cyanide leaching to produce a cyanide-containing liquor that exhibits a surface tension of less than 40 Dyn/cm. U.S. Pat. No. 8,287,616 describes compositions for cyanide leaching which include at least one nonionic surfactant and a process for extracting metals utilizing those compositions. U.S. Pat. No. 4,929,274 describes a process for heap leaching that utilizes surfactant compositions including ethoxylated fatty esters, alkylsulfosuccinates or fatty alcohols in the cyanide-containing liquor. U.S. Pat. Appl. 2003/0192403 A1 also describes the use of surfactants including ethoxylated aliphatic alcohols during gold extraction. These references are incorporated, in their entirety, by reference.

Froth flotation of gold-bearing ore utilizes comminution (i.e., crushing and grinding the ore to fine particulates), thereby increasing the surface area of the ore for subsequent processing. The resulting fine powder is then mixed with water to form a slurry in which the desired mineral is rendered hydrophobic through the addition of one or more surfactants (sometimes referred to as "collector chemicals"). The particular additives selected will depend on both which mineral or metal is being refined and the chemical nature of the ore from which the desired material is being extracted. The resulting slurry (often referred to as "pulp") comprising a mixture of hydrophobic particles and hydrophilic particles is then introduced to a water bath and aerated, creating bubbles. The hydrophobic particles containing the desired mineral then attach themselves to the air bubbles, which carry the particles to the surface to become a part of a froth forming on the surface of the aeration vessel. This froth, with its increased concentration of the desired mineral can then be removed for additional processing.

To be effective on a given ore slurry, the surfactants are chosen based upon their selective wetting of the types of particles being separated. A well-chosen surfactant will selectively adsorb, physically or chemically, with one of the types of particles. This combination of the particle and the surfactant allows the particles to bind effectively to the surface of a bubble. Flotation can be performed using a number of techniques and apparatus including, for example, mechanically agitated cells or tanks, flotation columns or Jameson cells.

Mechanical cells typically include a large mixer and diffuser mechanism at the bottom of the mixing tank to introduce air and provide mixing action. Flotation columns typically incorporate one or more air spargers for introducing air at or near the bottom of a tall column while introducing slurry near the top of the column. The countercurrent motion of the slurry flowing down the column and the air flowing up the column provides a mixing action. Jameson cells do not incorporate impellers or spargers, but instead combine the slurry with air in a downcomer where high shear creates the turbulent conditions required for bubble particle contacting.

Regardless of the equipment selected, the process conditions including, for example, the flow rate(s), tank dimensions and/or agitation conditions are typically selected to activate the desired minerals and achieve the desired degree of bubble attachment. In some configurations, a conditioner pulp is fed to a bank of rougher cells which remove most of the desired minerals as a concentrate. The rougher pulp then passes to a bank of scavenger cells where additional reagents may be added. The scavenger cell froth can then be returned to the rougher cells for additional treatment or sent a separate set of cleaner cells with the residual scavenger pulp usually being discarded as tails. More complex flotation circuits may include several sets of cleaner and re-cleaner cells, and intermediate re-grinding of pulp or concentrate.

Surfactants either chemically bond (chemisorption) on a hydrophobic mineral surface, or adsorb onto the surface physisorption (or physical adsorption). Surfactants are typically selected to increase the natural hydrophobicity of the surface, thereby increasing the separability of the hydrophobic and hydrophilic particles. A number of xanthates are used in this manner including, for example, potassium amyl xanthate (PAX), potassium isobutyl xanthate (PIBX), potassium ethyl xanthate (KEX), sodium isobutyl xanthate (SIBX), sodium isopropyl xanthate (SIPX) and sodium ethyl xanthate (SEX). Other surfactants include, for example, dithiophosphates, thiocarbamates, xanthogen formates, thionocarbamates, thiocarbanilide, palmitic acid and various amines.

Other additives may be incorporated including, for example, wetting agents, frothing agents that can include, for example, pine oil, alcohols, for example, methyl isobutyl carbinol (MIBC), polyglycols, polyoxyparafins, cresylic acid (xylenol), pH modifiers including, for example, lime (CaO), soda ash ($Na_2CO_3$), caustic soda (NaOH) and mineral and/or organic acids. Cationic modifiers may include, for example, $Ba^{2+}$, $Ca^{2+}$, $Cu^+$, $Pb^{2+}$, $Zn^{2+}$, $Ag^+$, anionic modifiers may include, for example, $SiO_3^{2-}$, $PO_4^{3-}$, $CN^-$, $CO_3^{2-}$, $S^{2-}$ and organic modifiers may include, for example, dextrin, starch, gum(s) and/or carboxymethyl cellulose (CMC).

However, while these surfactants and other additives may tend to improve the flotation yield, some of these same materials tend to reduce the effectiveness of the activated carbon downstream, thereby suppressing the overall process yield because of carbon fouling or other effects, and/or may interfere with subsequent extraction processes including, for example, electrowinning.

It is, therefore, an object of the invention to provide a combination of compositions and processes that increase the overall yields of the desired metal(s), in particular of gold and/or silver, based on the starting material used.

BRIEF DESCRIPTION

The disclosed methods incorporate a range of cationic chemical additives and associated dosing methods for treating post-flotation process streams to increase the activated carbon capacity and/or improving electrowinning performance to increase the overall extraction of precious metals from a particular ore.

The methods disclosed herein utilize at least one cationically charged compound selected from, for example, a group consisting of amines, particularly quaternary amines such as alkyldimethylbenzylammonium chloride (ADBAC) compositions, diallyldimethylammonium chloride (DADMAC) compositions (e.g., CAS 7398-69-8), polyamines and other suitable cationic materials and mixtures thereof, for neutralizing and coagulating excess flotation reagents and flotation reagent by-products to reduce the fouling of the activated carbon by these compounds downstream of the flotation circuit.

Lab studies have indicated that an appropriate dosage of a composition containing one or more cationic compounds, such as 40 mg/l of ML2005, available from ChemTreat, Inc. of Glen Allen, Va., that comprises a solution of quaternary ammonium compounds, water and ethanol, provides significant improvement of the downstream activated carbon capacity and increases the gold content in ounces per ton of carbon which can be extracted from a given ore. Lab studies also indicated no reduction in the activated carbon's gold capacity at ML2005 treatment dosages up to 200 mg/l (200 ppm). The copper content in the carbon was also unaffected by the addition of the cationic reagents at all dosages tested.

Process monitoring can be implemented by utilizing the particle charge density ("PCD") technology developed by BTG industries. This technology is widely used in the pulp and paper industry for improving control of the amount of cationic or anionic charge on paper machines and may be implemented using any appropriate analyzers including, for example, BTG/Mutek analyzers. It is anticipated that this PCD technology may be useful for monitoring the floatation circuit concentrate and/or tails chemistry and/or activated carbon tails chemistry. Field trials using a portable lab analyzer have indicated that this type of analyzer may be used for monitoring the demand, sufficiency and residual concentrations of the cationic additive(s) and performance benefits during plant operation. Turbidimetric, colorimetric and/or other analytical test methods to measure low levels (less than 10 ppm) of residual cationic additives may also be used during plant operations to prevent overfeed of the additive. The testing can be conducted on a continuous or periodic basis and can be automated, semiautomated or manual and/or may include, for example, "grab" sampling of any of the relevant process streams at various points of interest for controlling and/or monitoring the process(es).

BRIEF DESCRIPTION OF THE DRAWINGS

In order to provide a more complete explanation of the treatment compositions, methods and associated systems as disclosed and claimed herein, and the various embodiments thereof, attention is directed to the accompanying figures, wherein:

The foregoing figures, being merely exemplary, have been simplified to represent various basic operational components that may be utilized in practicing one or more embodiments of the disclosed methods depending upon the particular operational parameters. It is believed that these figures are sufficient to illustrate the basic design elements to a degree that one of ordinary skill in the art can readily develop an understanding of the various embodiments and aspects of the invention as disclosed and claimed herein.

DETAILED DESCRIPTION

Figure 1:
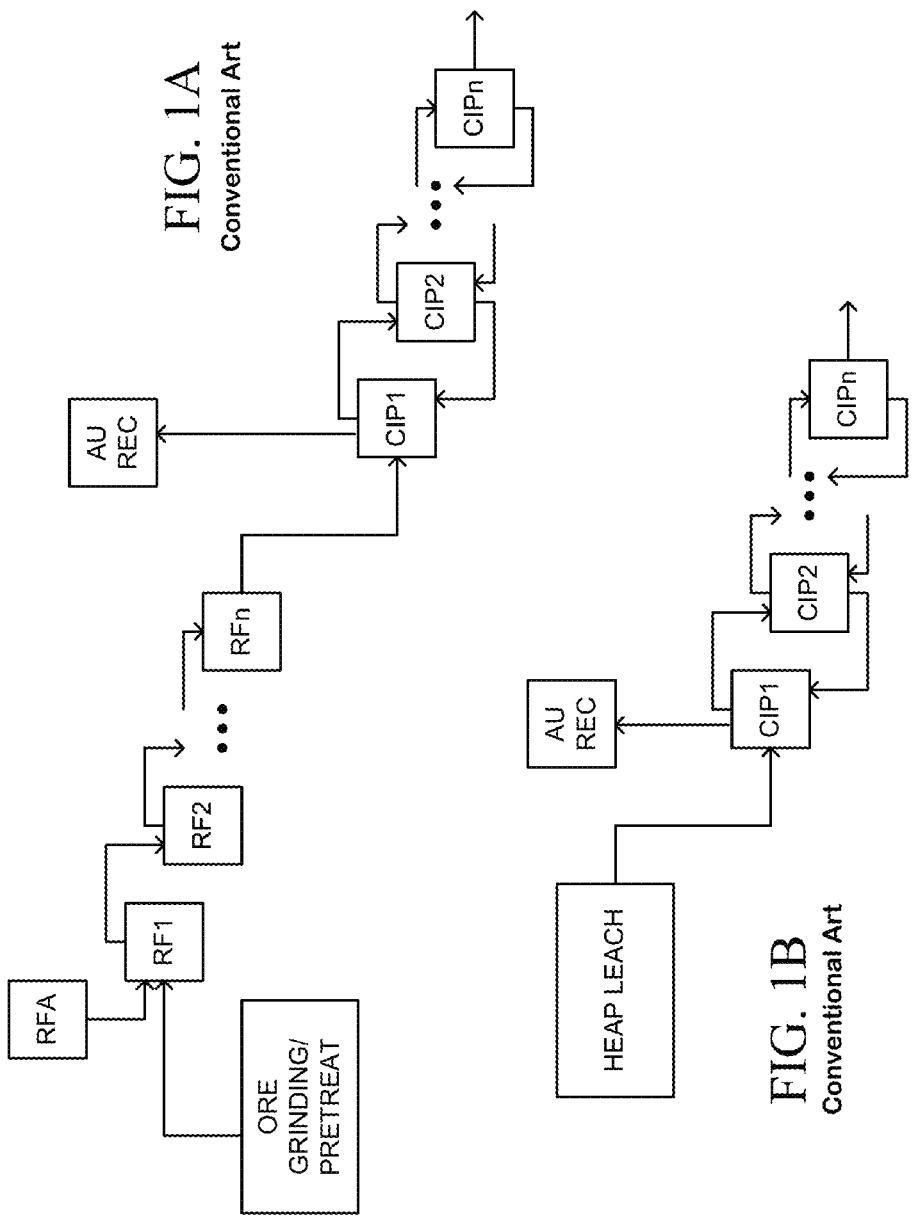
FIG. 1A illustrates a first conventional prior art process, specifically a simplified process diagram for portion of a mining operation including a pair of flotation arrays and a carbon-in-pulp array used for recovering target metals including, for example, gold, silver and/or copper.
FIG. 1B illustrates a second conventional prior art process, specifically a simplified process diagram for portion of a mining operation including a heap leach and a carbon-in-pulp array used for recovering target metals including, for example, gold, silver and/or copper from the pregnant liquor extracted from the heap.

As illustrated in FIG. 1A, a conventional gold extraction process may include an ore preparation process during which the ore is reduced to particles within a target size range. These ore particles are then introduced to one or more multi-stage flotation processes. As illustrated in FIG. 1A, the flotation process includes a rough flotation sequence, RF1 . . . RFn into which corresponding additive compositions RFA are introduced to provide the desired combination of surfactants, frothing agents and other modifiers for promoting the separation of the desired minerals (metal(s)) during the flotation process.

As illustrated in FIG. 1B, a conventional heap leach gold extraction process may include an ore preparation process during which the ore is reduced to particles within a target size range. These ore particles are then formed into large piles (heaps) and irrigated with an extraction solution that removes the desired metal from the ore and forms a metal concentrate solution (also referred to as pregnant liquor) that is collected at the bottom of the heap.

The separated froth or metal concentrate stream (or pregnant liquor) is then fed into an activated carbon process for collecting the desired metal. As noted above, the activated carbon can be arranged in a variety of configurations including, for example, CIP, CIC (not shown) and CIL (not shown), each of which also has an associated range of equipment and techniques that can be incorporated as desired to control the collection process. In the illustrated CIP arrangement, the pregnant solution from the flotation processes is passed through a series of CIP vessels, CIP1 . . . CIPn, while a counter current flow of activated carbon is passed through the same series of CIP vessels, CIPn . . . CIP1. In addition to the pregnant solution, one or more additives, e.g., a cyanide solution, can be introduced before the solution enters the activated carbon process. The loaded carbon retrieved from the activated carbon process is then subjected to additional processing, AU REC (not illustrated), to recover the loading mineral, typically gold and/or other precious or rare metal(s).

A number of fundamental physical and chemical parameters affect adsorption by the activated carbon. The equilibrium capacity of activated carbon for the adsorption of gold is influenced by a number of factors. These include, for example, temperature, the nature of the raw material used to manufacture the carbon, the activation conditions used during carbon manufacture, pH, the concentration of free cyanide ions and spectator ions such as $Ca^{2+}$, $Na^+$ and $K^+$, the presence of organic solvents such as acetone, ethanol and acetonitrile, the presence of organic and inorganic foulants including, for example, xanthates and calcium carbonates.

Researchers have quantified some of the effects on the equilibrium behavior of the carbon-aurocyanide system under typical industrial adsorption conditions indicating that the aurocyanide only transforms into AuCN or metallic gold at high temperatures, in a strong acid solution or a combination of both acid and elevated temperature. At ambient temperature and in an alkaline solution, conditions typically found in a CIP/CIL adsorption circuit, the aurocyanide complex is generally adsorbed in a fully reversible manner.

A number of parameters relating to the carbon particles and the operating conditions can affect the kinetics of this adsorption. For example, smaller carbon particles tend to exhibit higher adsorption rates. The surface roughness of the carbon can affect the film mass transfer coefficient for adsorption while the internal surface and pore diffusion properties of the carbon affect the physio-chemical characteristics of the carbon. Process parameters may include, for example, the temperature, the energy and mechanism used in agitating the pulp and the solids content of the pulp. Under conventional industrial conditions it is suspected that adsorption rates are limited by film-transfer effects whereby increased agitation should improve adsorption rates. Other parameters include oxygen concentration, pH with lower pH values tending to increase adsorption. Competing ions that are adsorbed with gold including, for example, silver, copper and nickel that, if present in sufficiently high concentrations, will tend to retard gold adsorption and finally, physical blocking or occlusion of the carbon pores by fine solids or precipitated material.

Figure 2:
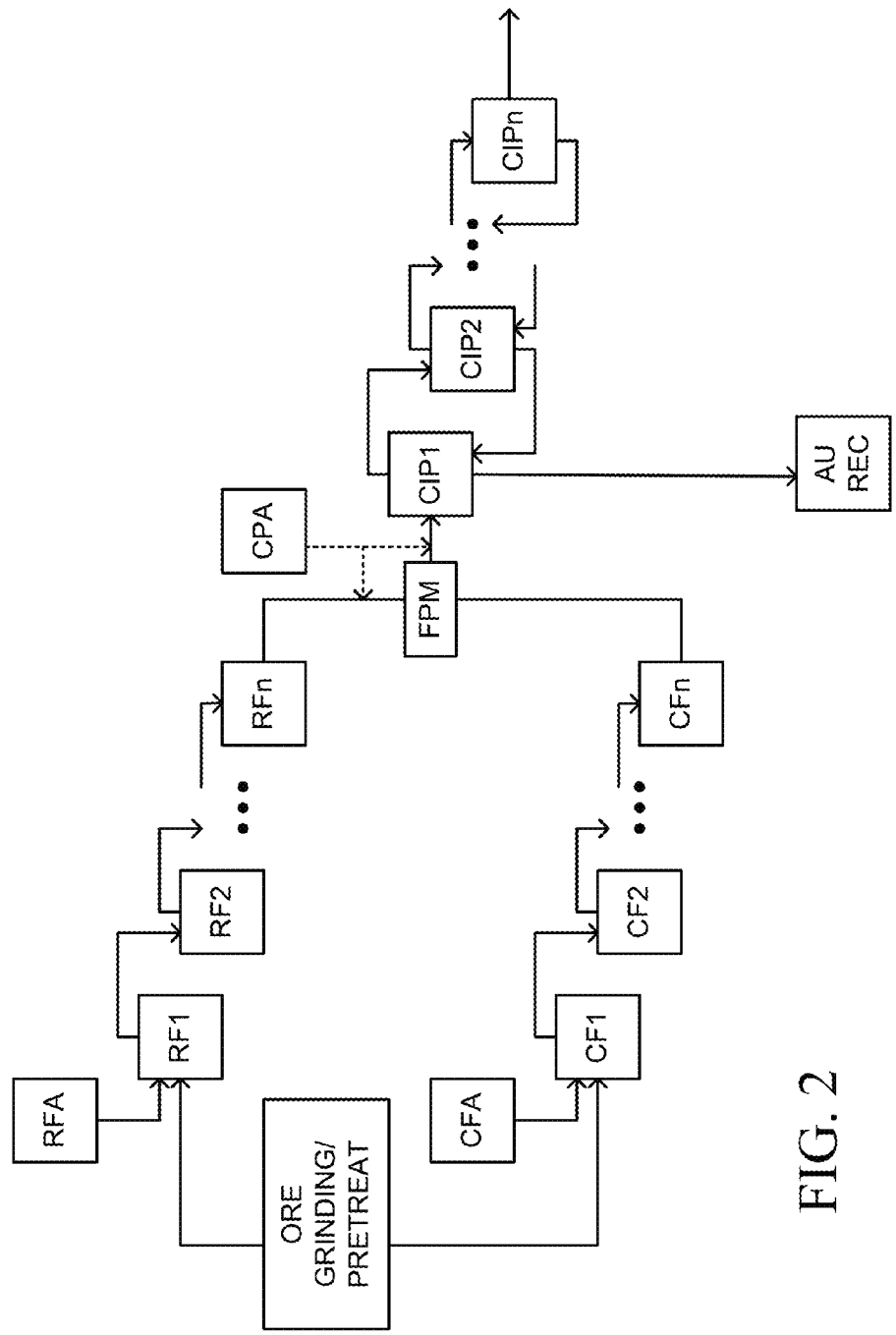
FIG. 2 illustrates a process diagram for a process modified in accord with an embodiment of the invention in which the metal concentrate composition entering the activated carbon process is modified with the addition of a cationically charged compound.

As illustrated in FIG. 2, a first embodiment of the disclosed processes includes a second (optional) flotation process comprising a cleaner and/or scavenger flotation sequence, CF1 . . . CFn, into which corresponding additive compositions CFA, are introduced to provide the desired combination of surfactants, frothing agents and other modifiers for promoting the separation of the desired minerals (metal(s)) during the flotation process. This first embodiment further involves the addition of at least one cationically charged compound selected from, for example, a group consisting of amines, particularly quaternary amines, polyamines, diallyldimethylammonium chloride (DADMAC) compositions and other suitable cationic materials and mixtures thereof. Also of particular interest are those quaternary amines classified as alkyldimethylbenzylammonium chlorides (ADBAC) that incorporate a positively charged nitrogen (cation) that is covalently bonded to three alkyl group substituents and a benzyl substituent that can be characterized by the structure:

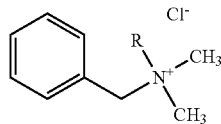

[8]

where R may be characterized by $C_nH_{2n+1}$ with n satisfying the relationship $8 \le n \le 18$. The ADBAC composition will typically include compounds exhibiting a mixture of carbon chain lengths, the majority of the carbon chains typically satisfying the relationship $12 \le n \le 16$.

The cationically charged compound(s) is introduced, CPA, in an amount sufficient to suppress the carbon fouling effects of excess surfactant, typically one or more anionic surfactant(s), exiting the flotation process. The dosing of the cationically charged compound(s) can be controlled in response to the solution monitor, FPM, that may, for example, be configured to provide particle charge density (PCD) readings obtained by analyzing the flotation circuit concentrate chemistry.

The addition of the amine cationic compounds will tend to neutralize the anionic organic compounds including, for example, surfactants and polymers, and tend to make the particle charge density of the metal concentrate stream more positive (less negative). It is believed that when the dosing of the amine cationic compounds approaches or slightly surpasses that of the anionic organic compounds, a substantially neutral charge density will be obtained. This substantially neutral charge density may reflect a charge density measurement within ±100 mV, preferably within ±25 mV, more preferably within ±5 mV and most preferably within ±1 mV.

Confirmation of the PCD sensor readings may be made using potentiometric titration technique as reflected, for example, in ASTM D5806-95 for determining active matter in quaternary ammonium salts (in disinfectants), particularly n-alkyldimethylbenzylammonium chloride, cetyltrimethylammonium chloride, blends of n-octyldecyl dimethylammonium chloride, di-n-octyl dimethylammonium chloride, and di-n-decyldimethyl ammonium chloride or ASTM D5070-90 for determining active matter in quaternary ammonium salts (in fabric softeners), particularly dialkyl dimethyl quaternary ammonium compound type and the diamidoamine based quaternary ammonium compound type.

As testing has indicated that an excess of the amine cationic on the order of at least up to 200 ppm does not degrade the performance of the activated carbon, it may be preferable to run the process under conditions that result in an excess of the cationic compound in the adjusted metal concentrate stream. Operating under these conditions will also allow the monitoring and/or analysis to focus not on particle charge density, but rather utilize one or more technique for ascertaining the presence of an excess of the cationic compound(s) including, for example, quaternary ammonium salts, in the adjusted metal concentrate stream.

Lab testing on flotation metal concentrate samples has suggested that a feed of the cationically charged compound(s) necessary to achieve concentrations on the order of 10-200 ppm may reasonably be expected to achieve a neutral charge density depending on the quantity and nature of the excess anionic organic compounds (and convert the initially negative PCD readings to a substantially neutral or positive value). Initial testing has also suggested that a feed rate sufficient to maintain about 30-60 ppm of the cationic compound provides acceptable results, with a feed rate sufficient to maintain about 40 ppm showing the best results.

Compounds useful for practicing the disclosed methods include a range of water-soluble quaternary ammonium salts that can be represented by the formula:

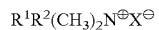

[9]

wherein $R^1$ is a saturated or olefinically-unsaturated acyclic aliphatic hydrocarbyl group, $R^2$ is a saturated or olefinically unsaturated acyclic aliphatic hydrocarbyl group, a benzyl group or an alkyl-substituted benzyl group, and X is an anion, wherein (a) if $R^2$ is a benzyl or alkyl-substituted benzyl group, $R^1$ has in the range of (or an average in the range of) about 12 to about 16 carbon atoms, and (b) if $R^1$ and $R^2$ are saturated or olefinically-unsaturated acyclic aliphatic hydrocarbyl groups, they need not be identical and each can have in the range of 4 to about 16 carbon atoms as long as the total number of carbon atoms in these two groups is in the range of (or comprise an average in the range of) about 16 to about 20 carbon atoms.

Examples of the benzyl type compounds that may be used in practicing the disclosed methods include dodecyldimethyl benzyl ammonium chloride, tridecyldimethyl benzyl ammonium chloride, tetradecyldimethyl benzyl ammonium chloride, pentadecyldimethyl benzyl ammonium chloride, hexadecyldimethyl benzyl ammonium chloride, dodecenyldimethyl benzyl ammonium chloride, tridecenyldimethyl benzyl ammonium chloride, tetradecenyldimethyl benzyl ammonium chloride, pentadecenyldimethyl benzyl ammonium chloride, hexadecenyldimethyl benzyl ammonium chloride, a mixture of dodecyl- and tetradecyldimethyl benzyl ammonium chlorides, a mixture of dodecyl-, tetradecyl-, and hexadecyldimethyl benzyl ammonium chlorides, a mixture of dodecyl-, tetradecyl-, hexadecyl-, and octadecyldimethyl benzyl ammonium chlorides having an average of about 14 carbon atoms in the molecule, a mixture of decyl-, dodecyl-, and tetradecyldimethyl benzyl ammonium chlorides having an average of about 12 carbon atoms in the molecule, a mixture of dodecyl- and dodecenyldimethyl benzyl ammonium chlorides, the bromide analogs of these compounds, and other analogous quaternary ammonium compounds.

Examples of the dihydrocarbyl-type of quaternary ammonium compounds that may be utilized in practicing the disclosed methods include (butyl)(dodecyl)dimethylammonium chloride, (hexyl)(decyl)dimethylammonium chloride, (hexyl)(undecyl)dimethylammonium chloride, dioctyldimethylammonium chloride, dinonyldimethylammonium chloride, didecyldimethylammonium chloride, (octyl)(decyl)dimethyl-ammonium chloride, (octyl)(undecyl)dimethylammonium chloride, (octyl)(dodecyl)dimethyl-ammonium chloride, (hexyl)(tridecyl)dimethylammonium chloride, (hexyl)(tetradecyl)dimethyl-ammonium chloride, (octyl)(7-methylnonyl)dimethylammonium chloride, di(3,4-dimethyloctyl)dimethylammonium chloride, di(4-octenyl)dimethylammonium chloride, di(8-nonenyl)dimethylammonium chloride, di(5-decenyl)dimethylammonium chloride, (butyl)(2-hexadecenyl)dimethylammonium chloride, (octenyl)(octyl)dimethylammonium chloride, the bromide analogs of these compounds, and other analogous quaternary ammonium compounds.

Methods for the preparation of quaternary ammonium compounds are well known and published in the literature and, indeed, many such compounds are readily available on the commercial chemical market. Such compounds are discussed in, for example, U.S. Pat. No. 6,010,996, the contents of which are incorporated, in their entirety by reference.

Utilizing the system configuration illustrated in FIG. 2, the cationically charged compound(s) can be introduced into the flotation concentrates stream after exiting the flotation circuit or before entering the activated carbon circuit, CPA. The monitoring, FPM, if utilized, can be conducted before injection of the cationic compound(s) to provide an opportunity to adjust to dose to match the anionic nature of the concentrated metal stream. Alternatively, monitoring, FPM, if utilized, can be conducted after injection and reaction of the cationic compound(s) to ensure that the dose matched the anionic nature of the concentrated metal stream. Additional equipment (not shown) may be incorporated to ensure that the cationic compound(s) being introduced experience sufficient contact time and mixing energy to neutralize and/or complex the excess anionic species, e.g., one or more xanthate surfactants, and reduce the fouling of the activated carbon. Reducing the fouling of the activated carbon by the flotation surfactants will tend to increase the rate and quantity of gold and consequently improve the percent gold recovery.

Depending on the particular surfactant species involved, the dosing point and the equipment configuration downstream of the dosing point may affect the effectiveness of the method. The dosing point and configuration should be selected whereby sufficient contact time is allowed and mixing provided in order for the relatively low concentrations (generally less than 200 ppm and more typically less than 100 ppm) of cationic and anionic species to react/complex without losing a substantial quantity of the cationic species to reaction/complexing with other solids present in the stream. It is believed that in most instances, a contact time on the order of 1-10 minutes will be sufficient to achieve the desired result. For example, it is believed that contact times of 4-6 minutes at moderate mixing energy levels (for example, G factors in the 100-200 range) will achieve sufficient reaction/complexing of the cationic and anionic species without undue demand for the cationic species attributable to the additional solids in the flotation stream.

Figure 3:
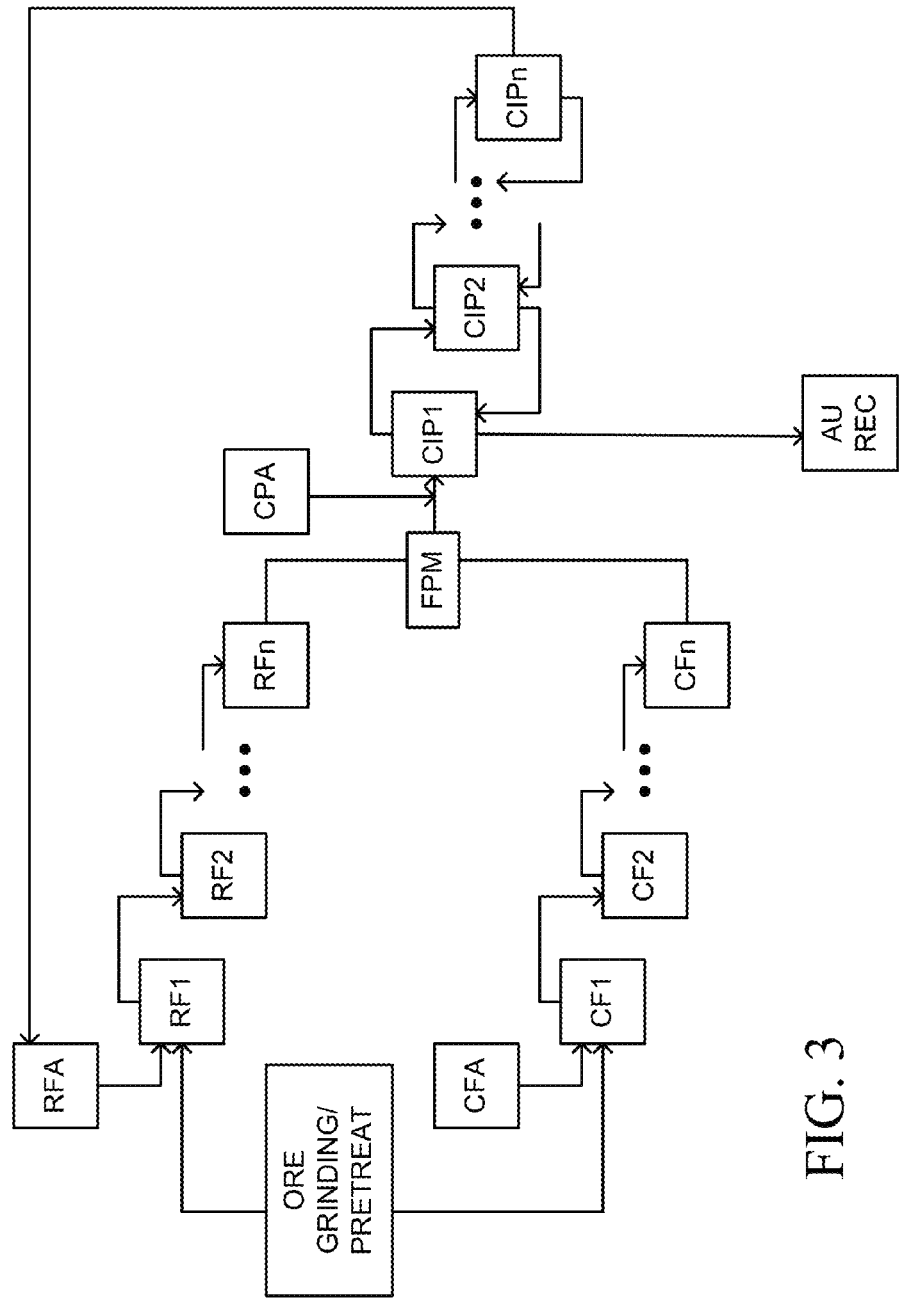
FIG. 3 illustrates a process diagram for a process modified in accord with another embodiment of the invention in which the metal concentrate composition entering the activated carbon process is modified with the addition of a cationically charged compound and at least a portion of the carbon process tail solution is recycled into at least part of the flotation process.

As illustrated in FIG. 3, a second embodiment of the disclosed processes expands upon the embodiment illustrated in FIG. 2 to provide for recycling at least a portion of the activated carbon circuit tails into the feed stream for at least one of the flotation circuits, whereby a predetermined concentration of one or more cationically charged compound(s) used in the activated carbon circuit can be used for modifying the performance of at least one of the flotation circuits. As noted above, these cationic species will tend to bind with anionic species, e.g., to form one or more compounds with different physiochemical properties than either of the source compounds. The new compound(s) may be hydrophobic and may partition into sludge or other particles present in the activated carbon circuit.

Despite the conventional wisdom regarding the segregation of the cationic surfactants and any resulting cationic/anionic complexes, however, in practice it appears that some portion of the cationic species or their byproducts may survive the activated carbon circuit and, in the process illustrated in FIG. 3, may comprise a portion of the recycle stream that is subsequently introduced into the rough flotation circuit. Further, it appears that this residual cationic species or complex may constitute a surprisingly beneficial additive to the flotation circuit.

Figure 4:
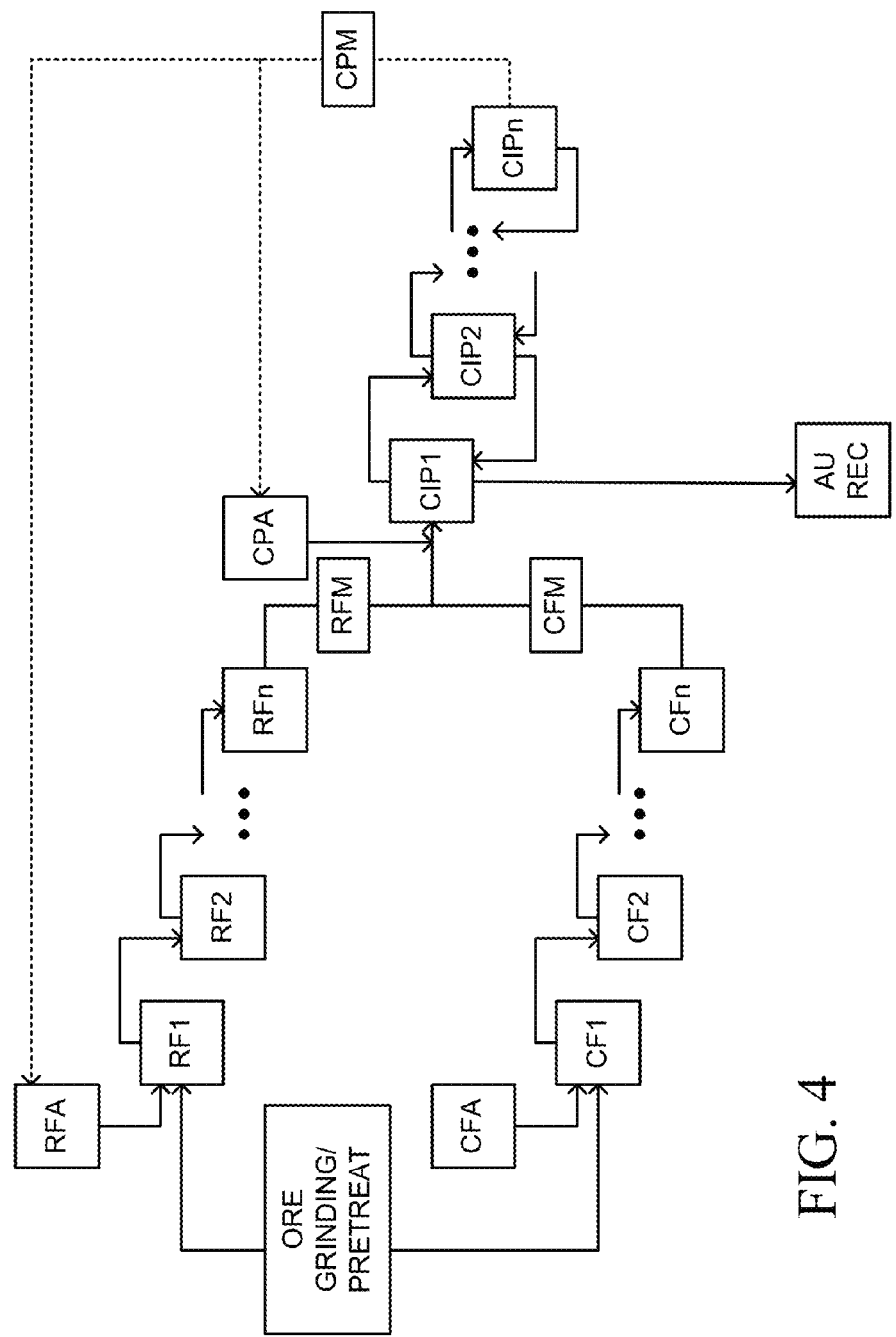
FIG. 4 illustrates a process diagram for a process modified in accord with another embodiment of the invention in which the metal concentrate composition entering the activated carbon process is modified with the addition of a cationically charged compound and at least a portion of the carbon process tail solution is recycled into at least part of the flotation process or the pre-carbon adjustment solution.

As illustrated in FIG. 4, a third embodiment of the disclosed processes expands upon the embodiment illustrated in FIG. 3 to provide for recycling at least a portion of the activated carbon circuit tails into the feed stream for at least one of the flotation circuits and/or the additive feed stream for the activated carbon circuit. This third embodiment also provides for independent monitoring of the tails from the rough, RFM, and cleaner, CFM, flotation circuits.

Figure 5:
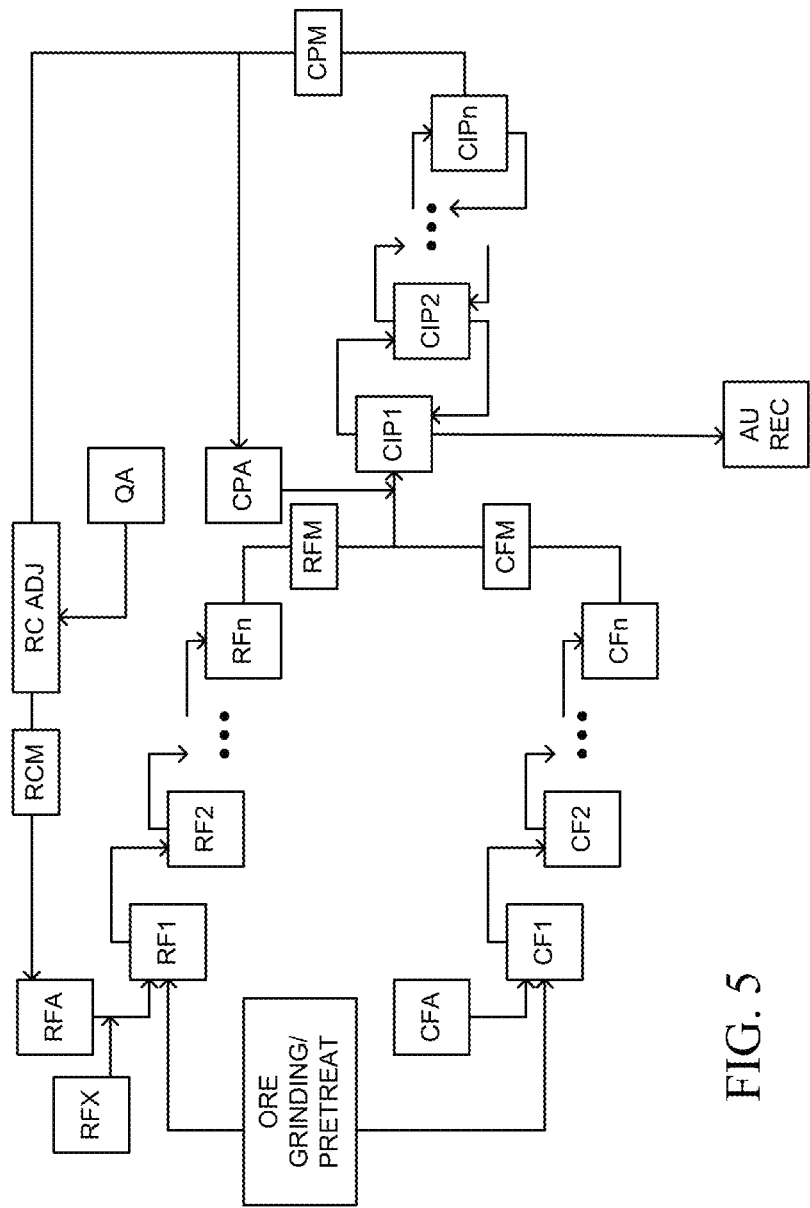
FIG. 5 illustrates a process diagram for a process modified in accord with another embodiment of the invention in which the metal concentrate composition entering the activated carbon process is modified with the addition of a cationically charged compound and composition entering a least one of the flotation processes is modified with the addition of a cationically charged compound.
Figure 6:
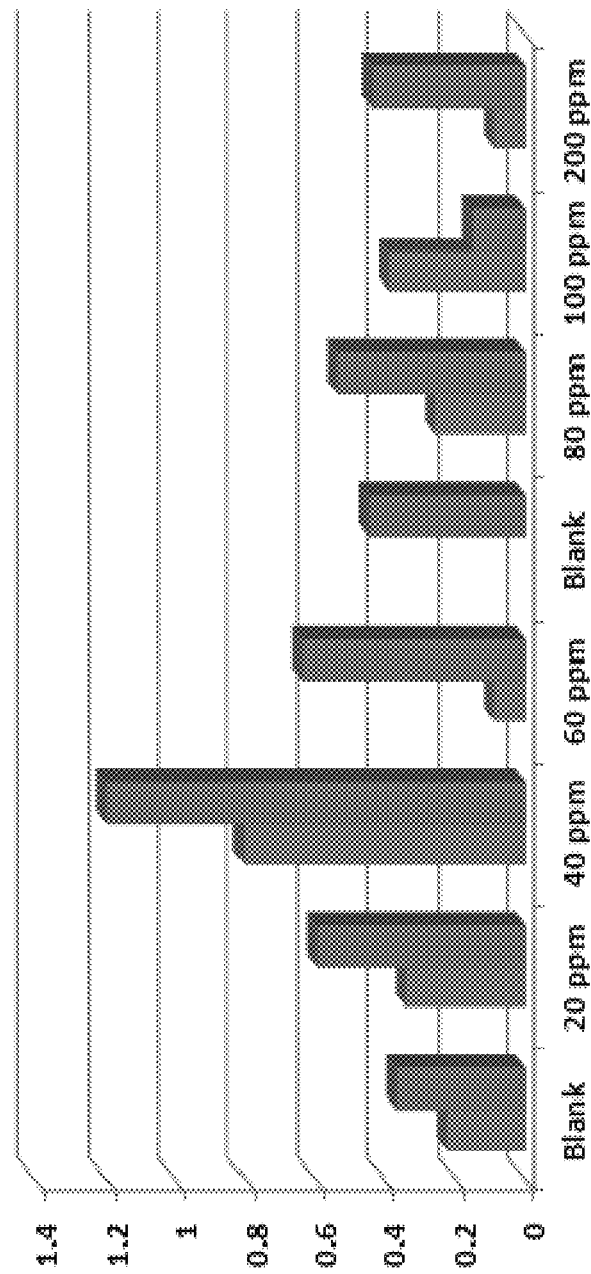
FIGS. 6-9 illustrate test results for the recovery of gold (in ounces per ton (OPT) of carbon by fire assay), FIG. 6, silver, FIG. 7, and copper, FIG. 8, as well as the carbon activity, FIG. 9, achieved at various loadings of a solution containing components selected from a group consisting of amines, particularly quaternary amines such as ADBACs, and polyamines.
Figure 7:
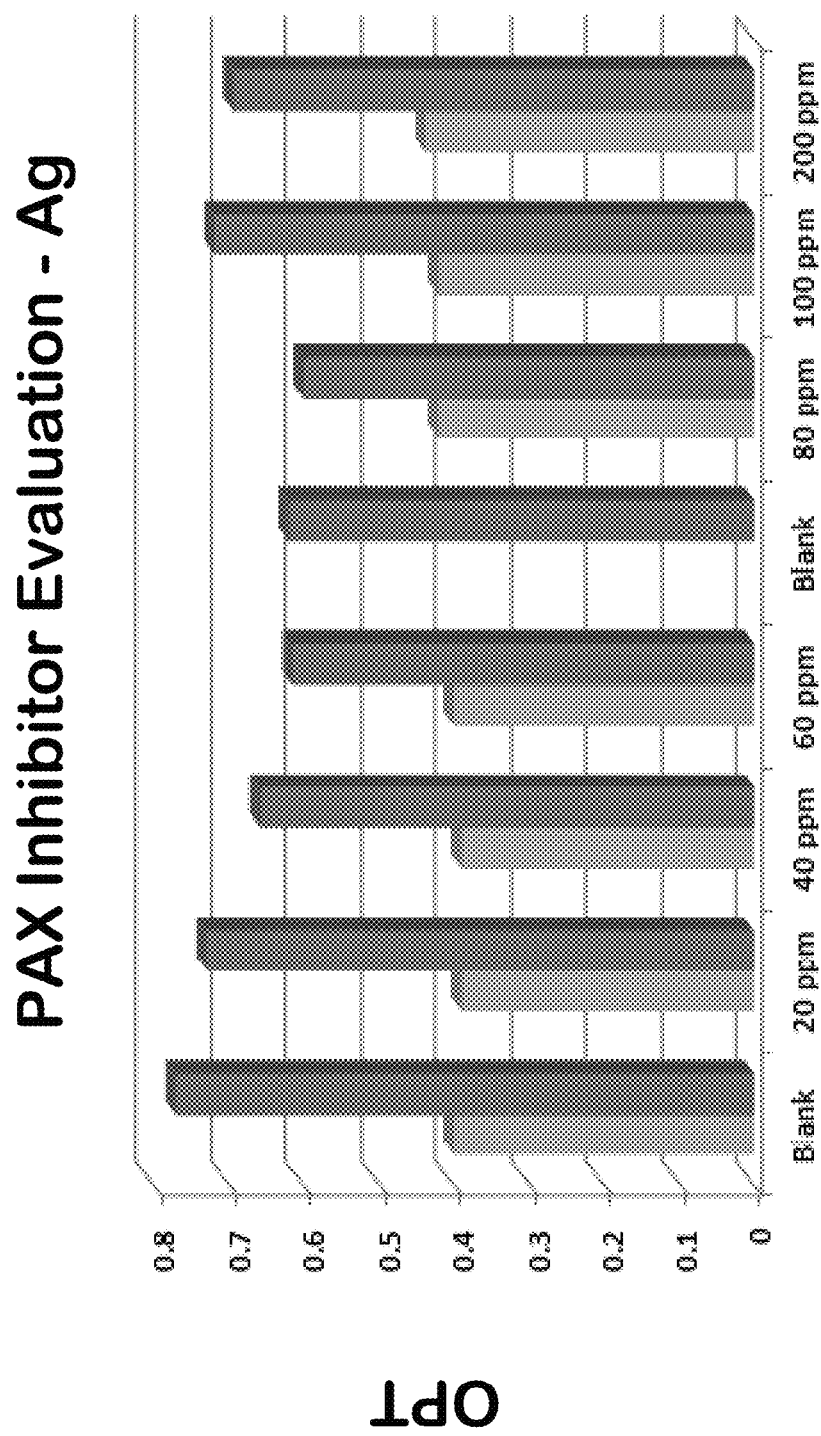
Figure 8:
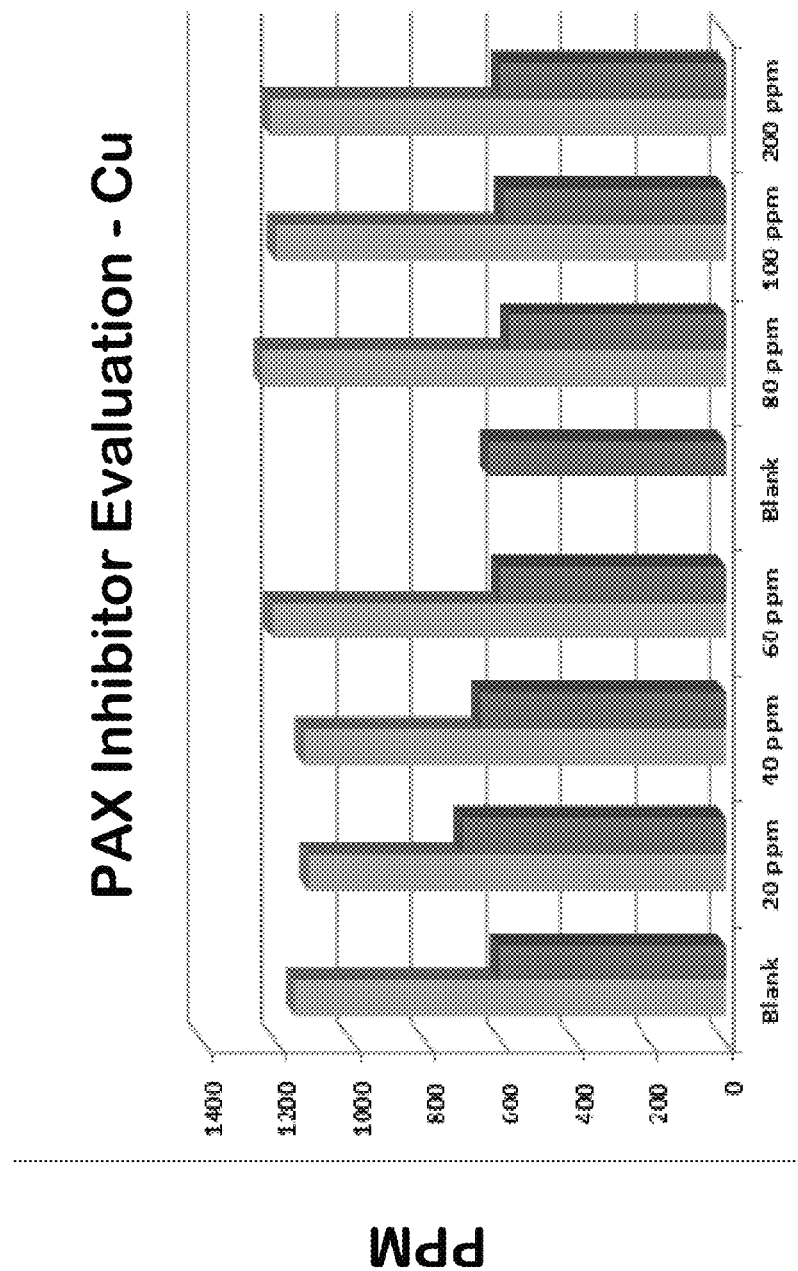
Figure 9:
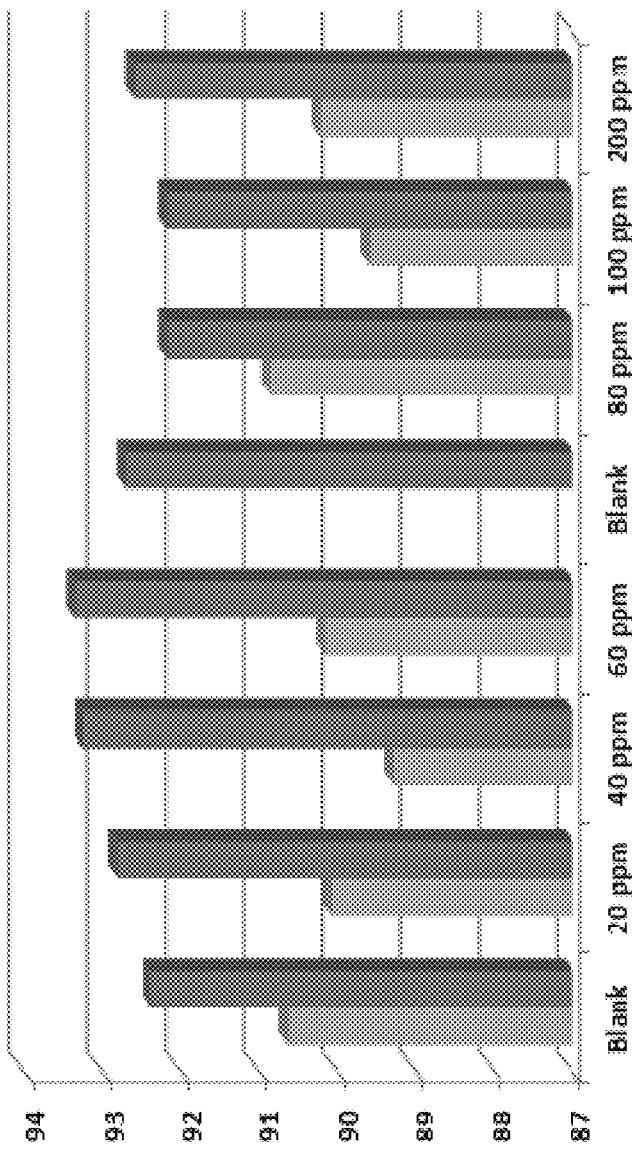

As illustrated in FIG. 5, a fourth embodiment of the disclosed processes expands upon the embodiment illustrated in FIG. 4 to provide for recycling at least a portion of the activated carbon circuit tails into the feed stream for at least one of the flotation circuits and/or the additive feed stream for the activated carbon circuit. This fourth embodiment also provides a control circuit for monitoring one or more characteristic properties of the recycle stream, RCM, and adjusting the composition of the recycle stream, RC ADJ, through introduction of additional surfactant species or other additive(s), QAD, before it is introduced into one or more flotation circuits and may provide for additional adjustment, RFX, for controlling the composition and/or particle charge density of the solution entering at least one of the flotation circuits.

Although, as discussed above, it is anticipated that the concentration of the excess anionic species will typically be less than 200 ppm, and more frequently, less than 100 ppm after completing a conventional flotation circuit, periodic excursions from these typical values are expected to result from, for example, overfeeding of flotation reagent(s) and/or other factors including, for example, ore composition, grind size, and environmental factors such as temperature and pH from lime addition.

Depending on the configuration utilized, the disclosed methods and systems will detect these excursions in the flotation circuit effluent using the streaming current/particle charge analyzers or other suitable detectors FPM, RFM and/or CFM, before entering the activated carbon circuit. The cationic surfactant dosage can then be adjusted in response to the magnitude of the excursion detected to ensure that the cationic demand (a function of excess reagent and the inherent anionic charge nature of ore slurries in general) can be satisfied in a timely and cost-effective manner.

Although several exemplary embodiments of this invention have been described in detail, it will be readily apparent to those skilled in the art that the disclosed mining processes, and the apparatus for implementing these processes, may easily be modified from the exact embodiments provided herein without materially departing from the essential characteristics thereof. In particular, the disclosed methods need not be practiced on systems that include two flotation circuits and, if multiple flotation circuits are present and recycle streams are utilized, they can be directed to one or more of the flotation and/or activated carbon circuits without departing from the disclosed invention.

Accordingly, therefore, these disclosures are to be considered in all respects as illustrative and not restrictive. As will be appreciated by those skilled in the art, a number of other embodiments of the methods according to the disclosure are both feasible and would be expected to provide similar advantages. The scope of the invention, therefore, should be understood as encompassing those variations of the example embodiments detailed herein that would be readily apparent to one of ordinary skill in the art.

Further, while certain process steps are described for the purpose of enabling the reader to make and use certain mining treatment processes shown, such suggestions shall not serve in any way to limit the claims to the exact variation disclosed, and it is to be understood that other variations, including various treatment additives may be utilized in practicing the disclosed methods.

We claim:

1. A method for recovering a metal in a leaching process comprising:
   obtaining a metal concentrate stream, the metal concentrate stream containing a concentration of a free anionic organic compound;
   combining a quantity of a cationic amine compound with the metal concentrate stream to form an adjusted metal concentrate stream, the quantity of the cationic amine compound being sufficient to neutralize at least a majority of the free anionic organic compound;
   mixing the adjusted metal concentrate stream with activated carbon under conditions such that the metal is selectively adsorbed on the activated carbon.

2. The method for recovering a metal in a leaching process according to claim 1, further comprising:
   determining a free anionic organic content of the metal concentrate stream; and
   adjusting the quantity of the cationic amine compound in response to the free anionic organic content.

3. The method for recovering a metal in a leaching process according to claim 1, wherein:
   the quantity of the cationic amine compound is sufficient to establish an excess concentration of the cationic amine compound.

4. The method for recovering a metal in a leaching process according to claim 3, further comprising:
   determining the excess cationic compound content of the adjusted metal concentrate stream; and
   adjusting the quantity of the cationic compound in response to the excess cationic compound content.

5. The method for recovering a metal in a leaching process according to claim 1, wherein:
   the metal concentrate stream is a concentrate stream from a flotation process.

6. The method for recovering a metal in a leaching process according to claim 1, wherein:
   the metal concentrate stream is a pregnant liquor stream from a heap leach operation.

7. The method for recovering a metal in a leaching process according to claim 1, wherein:
   the cationic amine compound is represented by the formula:

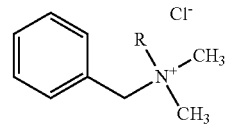

and wherein R is expressed as $C_nH_{2n+1}$ with n satisfying the relationship $8 \leq n \leq 18$.

8. The method for recovering a metal in a leaching process according to claim 7, wherein:
   n satisfies the relationship $12 \leq n \leq 16$.

9. The method for recovering a metal in a leaching process according to claim 1, wherein:
   the cationic amine compound is selected from the group consisting of amines, polyamines and mixtures thereof.

10. The method for recovering a metal in a leaching process according to claim 1, wherein:
    the cationic amine compound includes at least one alkyldimethylbenzyl ammonium chloride.

11. The method for recovering a metal in a leaching process according to claim 1, wherein:
    the adjusted metal concentrate stream exhibits a particle charge density of no more than ±100 mV.

12. The method for recovering a metal in a leaching process according to claim 5, further comprising:
    recycling a portion of an activated carbon tails stream into a feed stream for the flotation process.

13. The method for recovering a metal in a leaching process according to claim 12, further comprising:
    recycling a portion of an activated carbon tails stream into the adjusted metal concentrate stream.

14. The method for recovering a metal in a leaching process according to claim 12, further comprising:
    analyzing an ionic content of the activated carbon tails stream;
    adjusting the activated carbon tails stream to form an adjusted carbon tails stream exhibiting a substantially neutral particle charge density of ±100 mV.

15. The method for recovering a metal in a leaching process according to claim 3, wherein:
    the excess concentration of the cationic amine compound is no more than 200 ppm in the adjusted metal concentrate stream.

16. The method for recovering a metal in a leaching process according to claim 1, wherein:
    the quantity of the cationic amine compound is sufficient to establish a concentration of the cationic amine compound of from 25 ppm to 55 ppm in the adjusted metal concentrate stream.

17. The method for recovering a metal in a leaching process according to claim 1, wherein:
    the quantity of the cationic amine compound is sufficient to establish a concentration of the cationic amine compound of from 35 ppm to 45 ppm in the adjusted metal concentrate stream.

18. The method for recovering a metal in a leaching process according to claim 1, wherein:

the cationic amine compound is a water-soluble quaternary ammonium salt that is represented by the formula:

wherein $R^1$ is a saturated or olefinically-unsaturated acyclic aliphatic hydrocarbyl group, $R^2$ is a saturated or olefinically unsaturated acyclic aliphatic hydrocarbyl group, a benzyl group or an alkyl-substituted benzyl group, and X is an anion, wherein if $R^2$ is a benzyl or alkyl-substituted benzyl group, $R^1$ includes a first carbon chain of 12 to 16 carbon atoms, and further wherein, if both $R^1$ and $R^2$ are saturated or olefinically-unsaturated acyclic aliphatic hydrocarbyl groups including first and second carbon chains, a sum of the first and second carbon chains includes 16 to 20 carbon atoms.

* * * * *